United States Patent
Lu et al.

(10) Patent No.: US 11,667,210 B2
(45) Date of Patent: *Jun. 6, 2023

(54) DETECTION OF ELECTRIC VEHICLE CHARGING AT PREMISE

(71) Applicant: ORACLE INTERNATIONAL CORPORATION, Redwood Shores, CA (US)

(72) Inventors: Vivian Chun-hua Lu, San Jose, CA (US); Woei Ling Leow, San Francisco, CA (US); Rajagopal Iyengar, Oakland, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/826,651

(22) Filed: May 27, 2022

(65) Prior Publication Data

US 2022/0289064 A1    Sep. 15, 2022

Related U.S. Application Data

(63) Continuation of application No. 16/420,597, filed on May 23, 2019, now Pat. No. 11,383,612.
(Continued)

(51) Int. Cl.
*B60L 53/66* (2019.01)
*G06N 20/00* (2019.01)
(Continued)

(52) U.S. Cl.
CPC ............ *B60L 53/665* (2019.02); *G06N 5/04* (2013.01); *G06N 20/00* (2019.01); *H04W 4/021* (2013.01); *B60L 2250/22* (2013.01)

(58) Field of Classification Search
CPC ............... B60L 53/665; B60L 2250/22; B60L 2260/46; B60L 53/63; B60L 53/65;
(Continued)

(56) References Cited

U.S. PATENT DOCUMENTS 9,156,368 B2    10/2015  Chen et al.
9,576,245 B2     2/2017  Fischer et al.
(Continued)

OTHER PUBLICATIONS

Oracle Corporation; Oracle DataRaker, The Most Complete, Most Reliable Solution for Transforming Complex Data into Actionable Insight, 2014, pp. 1-12, Oracle Corp., Redwood Shores, CA.
(Continued)

*Primary Examiner* — Nha T Nguyen
(74) *Attorney, Agent, or Firm* — Kraguljac Law Group, LLC

(57) ABSTRACT

Systems, methods, and other embodiments are associated with detecting an electric vehicle charging event. The system receives unknown time series data of usage values of electricity consumption, wherein the unknown time series data is unknown to have electric vehicle (EV) charge events. For a given account, the unknown time series data is converted into time intervals with corresponding usage values. Each time interval is encoded with a symbol from a series of symbols representing a level of electricity consumption, wherein the encoding generates an encoded consumption pattern of symbols. The system detects whether the encoded consumption pattern includes a string of high usage symbols that are similar to a known EV charge motif that represents a known EV charging event. Based on the detecting, the given account is marked as having an electric vehicle charge event or as not having an electric vehicle charge event.

20 Claims, 5 Drawing Sheets

Related U.S. Application Data

(60) Provisional application No. 62/748,802, filed on Oct. 22, 2018.

(51) Int. Cl.
*H04W 4/021* (2018.01)
*G06N 5/04* (2023.01)

(58) Field of Classification Search
CPC .......... G06N 5/04; G06N 20/00; G06N 5/003; G06N 20/10; G06N 20/20; H04W 4/021; H04W 4/44; H04W 4/02; H04W 4/12; H02J 7/00032; H02J 7/0047; Y02E 60/00; Y02T 10/70; Y02T 10/7072; Y02T 90/12; Y02T 90/16; Y02T 90/167; Y02T 90/169; Y04S 10/126; Y04S 30/14; G06K 9/00523; G06K 9/00536; G06K 9/6267
See application file for complete search history.

(56) References Cited

U.S. PATENT DOCUMENTS

| | | |
|---|---|---|
| 2009/0112781 A1 | 4/2009 | Heath et al. |
| 2012/0123709 A1 | 5/2012 | Chen et al. |
| 2015/0077054 A1 | 3/2015 | Uyeki |
| 2016/0055419 A1* | 2/2016 | Fischer .................. G06N 5/048 706/12 |
| 2018/0231603 A1 | 8/2018 | Gupta et al. |
| 2019/0294953 A1* | 9/2019 | Bordaweker .......... G06N 20/00 |

OTHER PUBLICATIONS

Jessica Lin, et al.; Experiencing SAX: a Novel Symbolic Representation of Time Series, pp. 1-31, Jun. 2003, downloaded on May 23, 2019 from: https://cs.gmu.edu/~jessica/SAX_DAMI_preprint.pdf.

Patent Cooperation Treaty (PCT) International Search Report and Written Opinion issued in PCT International Application No. PCT/US2019/056490 (International Filing Date Oct. 16, 2019), dated Jan. 29, 2020 (15 pgs).

Intellectual Property India, "Examination Report under Sections 12 & 13 of the Patents Act, 1970 and the Patents Rules, 2003", issued in India Patent No. 202147006859, dated Dec. 21, 2022 (8 pgs).

Japanese Patent Office, "Notice of Reasons for Refusal", issued in Japanese Patent No. 2021-519540, having a Date of Drafting of Mar. 30, 2023 (4 pgs).

\* cited by examiner

DETECTION OF ELECTRIC VEHICLE CHARGING AT PREMISE

CROSS REFERENCE TO RELATED APPLICATIONS

This disclosure claims the benefit of U.S. patent application Ser. No. 16/420,597 filed May 23, 2019, titled "Detection of Electric Vehicle Charging at Premise", inventors: Lu et al., and also Provisional Patent Application Ser. No. 62/748,802 filed Oct. 22, 2018, titled "Detection of Electric Vehicle Charging at Premise", inventors: Lu et al., both assigned to the present assignee, which are both incorporated by reference herein in their entirety.

BACKGROUND

Recent advances in rechargeable batteries have made plug-in electric vehicles (EV) and hybrid vehicles accessible to larger portions of the population. EVs are seeing a tremendous increase in adoption. It is expected that over time, a significant fraction of vehicles in use will be EVs. These vehicles represent a significant load on the electric grids of cities and power supply since the EVs will need to charge periodically for operation. This results in a challenge for today's electric utilities, in that they need to be able to plan for this increased penetration of electric vehicles.

For example, on average, a typical household draws about 1.0 kWh of load from their local power utility. This may consist of typical household appliances such as washers, dryers, ovens, etc. However, the household load can change depending on several variables, such as weather-related HVAC usage. There may also be large variables such as pools, spas and on-site photovoltaic generation.

In contrast, an EV can draw 3 to 4 kW per hour or more. This presents a problem because one EV owner alone can indirectly add 4 households' worth of load to a service transformer, which can place that transformer at risk of being overloaded. Modern transformers can withstand a certain degree of overloading, however as the popularity and adoption of EVs grows, the risk of multiple EVs clustered on a single transformer will increase that risk. Moreover, the next generation of EVs are poised to come out with bigger batteries that require higher kWh charging, further heightening the risk to transformers.

When a customer purchases an electric vehicle and associated charging infrastructure, they are not obliged to inform the electric utility of the increased load that the EV represents to the electric grid. The increase in load at sufficient EV penetration rates can cause utility equipment failure and power outages on the grid.

If the utility were able to accurately identify EVs on their grid, they will be enabled to proactively take steps to ensure the health and reliability of their power generating equipment, power distribution equipment, electric grid equipment and other assets. Prior techniques for identifying EVs on a grid were not accurate or were not able to identify an EV at all.

It is of value to electric utilities to discover user accounts that consume energy to charge electric vehicles. Since electric vehicle charging represents a significant load on an electric grid, it is of interest to identify premises/locations of customers who have an electric vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
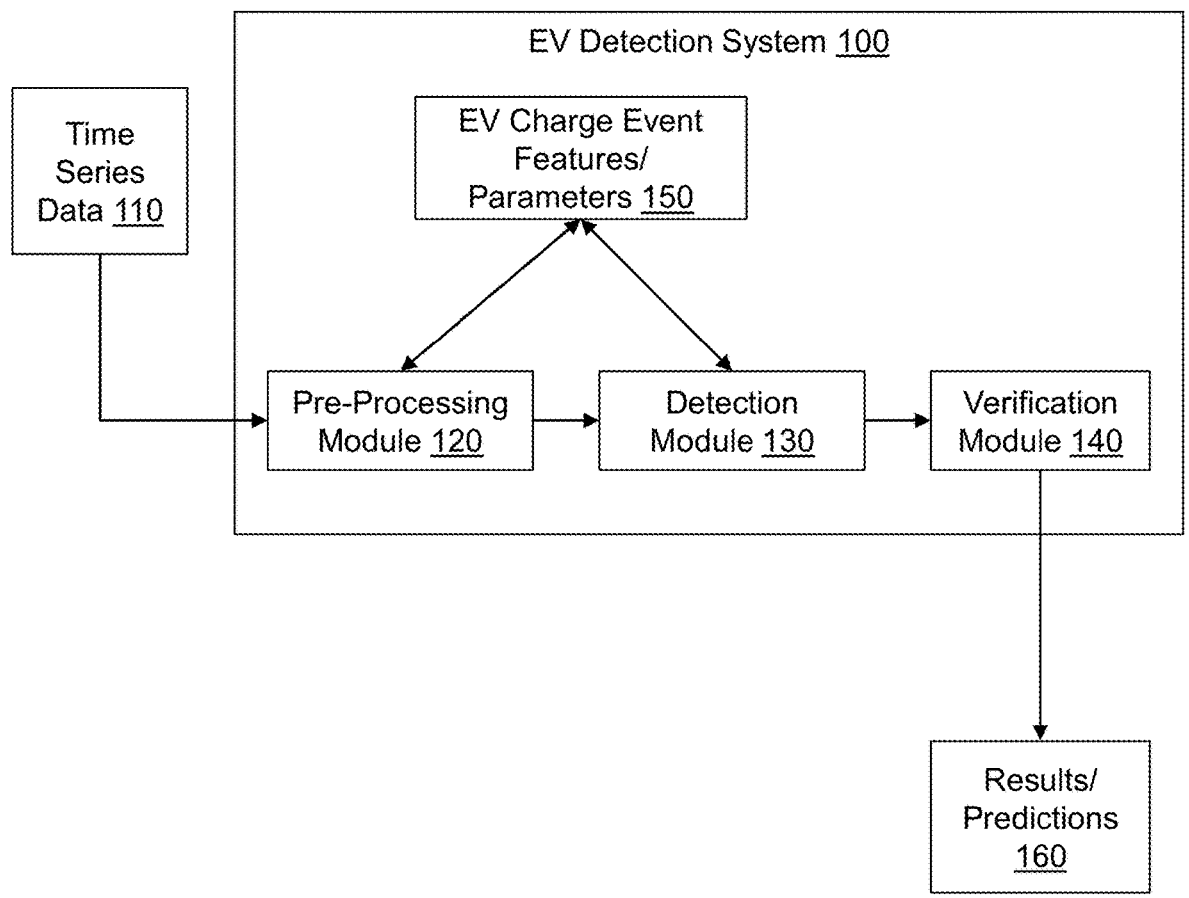
FIG. 1 illustrates one embodiment of a computing system configured to detect EV charge events.

Systems and methods are described herein, in one embodiment, that provide a novel system and method using motif discovery and detection to identify electric vehicle (EV) charge events from utility customer accounts that consume energy to charge electric vehicles. In one embodiment, the present systems and methods include training a machine learning classifier to identify electric vehicle charges based on at least EV charge motifs/patterns and charge features.

It is of value to electric utilities to discover user accounts that consume energy to charge electric vehicles. Since electric vehicle charging represents a significant load on the electric grid, it is of significant interest to identify these customers (e.g., identify their account and/or charging location). For example, if multiple EV owners are in the same neighborhood, they may be sharing the same electrical transformer. This may create a safety hazard on the transformer if too much electricity is drawn at the same time, thus overloading the transformer. This can cause physical damage to the transformer and even equipment failure. Threats to public safety, like conflagration, may result in extreme cases.

Thus if the multiple EV owners are identified in advance with the present system and method, steps may be taken to reduce or eliminate the potential issues in the grid and/or equipment. For example, power lines of homes with EVs may be rerouted to different transformers, the transformer may be replaced or resized with a higher capacity transformer, and/or EV owners may be sent alerts or notices that request a change in their EV charging times.

There may also be a number of additional benefits to the utility to being able to accurately identify large loads on a grid caused by EVs. These benefits may allow one or more resulting actions to be performed including, for example, (1) generating and transmitting messages to an EV owner to change their account to a different (better) electrical rate for EV charging, inducing better customer engagement; (2) identifying if EV owners are charging during on-peak or off-peak hours, and generating and transmitting instructions for modifying charging times and/or account settings that cause one or more EV owners to change to a "Time of Use" rate to shift charging load to off-peak hours; (3) identifying EV "hot spots" in a grid that may represent significant load increase in a specific area that has multiple EV owners; (4) identifying trends and velocity of EV uptake at system wide levels and at more localized levels so that corrective actions and modifications can be made to the electric grid equipment to ensure safe and proper electrical distribution (modify or resize transformers, reroute power lines, etc.).

Throughout this disclosure, the following terms are used as follows:

EV: Abbreviation for "Electric Vehicle."

EV owner: This represents a premise/location of an account that owns and/or charges an electric vehicle.

Non-EV owner: This represents a premise/location of an account that does not own or charge an electric vehicle.

Known EV owner: A label which states that an account (and its associated time series data) consumes electricity to charge an electric vehicle, which is known to an electric utility supplier. Thus the account time series data from a known EV owner is known to have EV charging events. This information is provided to one or more machine learning classifiers of the present system to identify and detect EV charging events from account data.

Known non-EV owner: A label which states that an account does not consume electricity to charge an electric vehicle, which is known to an electric utility supplier. Thus the account time series data of a known non-EV owner does not include EV charging events. This information is provided to the one or more machine learning classifiers to identify and detect non-EV charging events that may be used to distinguish from EV charging events.

House meter: This is an electronic device that records consumption of electric energy at a premise/location as electricity consumption data. The consumption amount is in kilowatts per hour (kWh) but other units may be used. The premise/location and thus the house meter are associated with a customer account. Although the term "house" is used for simplicity, it includes any type of premise that may have a meter. The house meter measures electric consumption for the entire premise which includes all appliances and components that draw electricity (including an EV if present). The measured data is typically collected in regular time intervals (e.g., 5 minute, 15 minute, 1 hour, etc.). A group of interval data is referred to as time series data. In one embodiment, the house meter is a smart meter that records consumption of electric energy and communicates the information via network communications to an electricity supplier (utility company) for monitoring and other purposes.

EV submeter: A meter installed at a premise of a known EV owner for directly monitoring and recording the charging activity of an electric vehicle only. An EV submeter is a similar device as the house meter but is a separate device installed in addition to the house meter. The EV submeter records the electricity drawn in kWh only by an electric vehicle and thus measures charging data in time series of the electricity used for only EV charging. No other electricity consuming components are connected to the EV submeter.

Account time series data: Data that represents the electric consumption in kWh units measured and collected from a house meter for an account under consideration as a whole over a period of time. The measured data is typically collected in time intervals. Fifteen (15) minute time intervals will be discussed herein but other intervals can be used (e.g., 5 minute, 30 minute, 1 hour, etc.).

Submeter time series data (EV submeter data): Data that represents the electric consumption in kWh units measured and collected from a dedicated EV submeter for only electric vehicle charging. The data is regularly collected at a set time interval, for example, 15 minute time intervals but other intervals can be used (e.g., 5 minute, 30 minute, 1 hour, etc.).

EV charging motif/pattern: An encoded string of letters or symbols that correspond to an identified EV charging event. The encoded string may have varying lengths based on a particular EV charging event and is based on an implemented encoding scheme.

With reference to FIG. 1, one embodiment of a computer-implemented EV detection system 100 is shown. The EV detection system 100 is configured to execute in a computing system and is configured with a novel technique to identify and detect EV charging motifs. The EV charging motifs represent electricity consumption patterns of symbols associated with electric vehicle charging events that can be identified from account time series data 110. Previous approaches look for electric consumption events of a certain pre-defined kWh magnitude, and are thus less accurate, less robust to noise and to other data related effects that may cause inaccurate detection. The present approach is more robust, brand and charger agnostic, informed by the charging data directly, and can learn and adapt over time as new EV charging motifs are discovered and added to a library of motifs.

The overall EV detection system 100 may be configured in three (3) logical stages, where each stage is implemented by an executable module: (1) pre-processing module 120; (2) detection module 130; and (3) verification module 140. A more detailed configuration and operation of each module will be described in the figures that follow.

In one embodiment, the pre-processing module 120 is configured to receive and/or retrieve time series data from one or more accounts, convert the data into an interval format is needed, and encode the interval data into a string of letters that quantize the kWh values. This module will be described in more detail with reference to FIG. 2.

In one embodiment, the detection module 130 is configured to analyze the time series data from multiple accounts of known EV owners and the encoded strings to detect designated strings (e.g., a word/group of letters) that best matches an EV charging pattern of strings. Charging features that were recorded as part of the EV charging event on submeter time series are taken from the account time series data and associated with the EV charging event as its characteristics. The features will be described below. The detection module 130 also performs a similar process on account time series data from a set of known non-EV owners to identify what type of charge patterns and features are not EV charging events. The detection module 130 will be described in more detail with reference to FIG. 2.

In one embodiment, the verification module 140 is configured to train one or more machine learning classifiers to learn what an EV charging pattern looks like based on at least the patterns found by the detection module 130. The training includes inputting charging features that are associated with each suspected EV charging event that is found by the detection module 130. The combination of the EV charging pattern of letters and its corresponding charging features trains the one or more machine learning classifiers to detect and identify similar EV charging events from unknown accounts. In the following descriptions, the one or more machine learning classifiers will be referred to as the classifier.

Also inputted to the classifier is an answer key to verify the determinations from the classifier. The answer key includes the submeter time series data for a labelled account being analyzed. As previously explained, the submeter data identifies whether the corresponding account time series data has an EV charge event and when the EV charge event occurs. Detection results/predictions 160 from the classifier may then be compared to the submeter data to verify the accuracy of the classifier and further train the classifier if the results 160 are inaccurate. The verification module 140 will be described in more detail with reference to FIG. 2.

Figure 2:
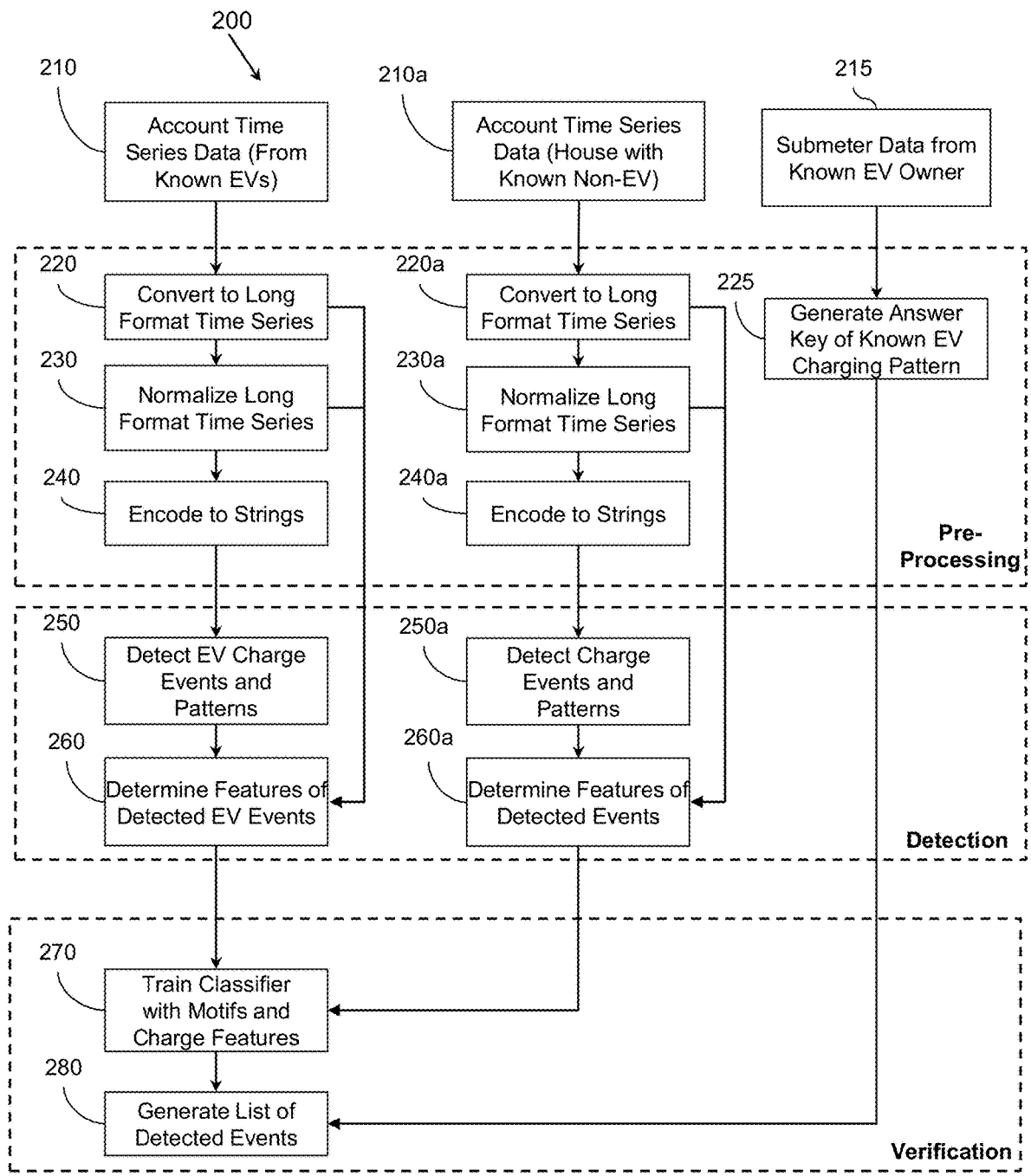
FIG. 2 illustrates one embodiment of a method performed by the system of FIG. 1 for detecting EV charge events and training a machine learning classifier.

With reference to FIG. 2, one embodiment of an EV detection process 200 is shown, which is implemented and performed by the EV detection system 100 of FIG. 1. The process 200 is a computer-implemented process performed by a computing system. The described actions and functions are performed at least by a processer that accesses data from a memory or storage device and generates data read from and/or written to the memory.

FIG. 2 shows three columns of process flow where each column represents a different type of data being processed, depending on data availability. At block 210 (left most column), the account time series data from known EV owners is processed. At block 210*a* (middle column), the account time series data from known non-EV owners is processed. At block 215 (right most column), the EV submeter data is processed. The three process columns are not necessary performed concurrently since they may be performed at different times from each other.

In the process of FIG. 2, blocks 210, 220, 230, and 240 correspond to the pre-processing module 120 of FIG. 1. Blocks 250 and 260 correspond to the detection module 130 of FIG. 1 and blocks 270 and 280 correspond to the verification module 140. It is noted that the pre-processing functions and the detection functions are performed on both types of data sets: the account time series data from known EV owners 210 and the account time series data from known non-EV owners 210*a*. The corresponding functions that are performed on data from known non-EV owners is designated with an "a" such as 220*a*, 230*a*, 240*a*, etc. Thus, the functions of block 220 and block 220*a* are the same except for the data set being processed.

Pre-Processing Stage (Blocks 220, 230, 240)

With continued reference to FIG. 2, at block 210, pre-processing begins where raw account time series data 110 from a known EV owner is retrieved and input to the pre-processing module 120. The present process is repeated for multiple known EV owners where if a set of time series data is available, each time series from each EV owner account is processed individually. For each known EV owner, their corresponding submeter time series data may also input concurrently or at a subsequent time (block 215). The account time series data 110 is read and retrieved by a processor of the computing system from a storage device or memory that stores the data in a data structure. In the following example, the account time series data 110 is recorded in 15 minute intervals of kWh charge values.

At block 220, the raw 15 minute interval kWh data from a house of a known EV owner is converted into a long format time series (i.e. there are 96 intervals in a day for 15-minute interval data. This generates a data vector of 1 row×96 columns. If there are 30 days of data available, each house meter will have a vector of 1 row×(96*30) columns. In one embodiment, only time series data from days with less than four (4) unknown or not available kWh values are considered. This function is also performed for the 15 minute interval kWh data from known non-EV owners at block 220*a*.

If corresponding EV submeter level data is available for an EV owner, an answer key is generated at block 225 that labels and identifies the time intervals when the EV is charging. The identified time intervals can then be used to identify the corresponding time intervals in the account time series data to verify if and when then EV charge occurred. This occurs later in the process.

Initially, the account time series data is analyzed without looking at the EV submeter data. To detect whether there is EV charging activity during the day from a known EV owner, the pre-processing module 120 analyzes the account time series data 110. As previously stated, the account time series data 110 shows house electricity usage (electricity consumption) in kWh from a known EV owner over a time period. The meter of a house records the electricity drawn and used by the entire house and thus includes the electricity used for EV charging, if any, combined with all other charges. This is referred to herein as account time series data.

In one embodiment, the EV submeter data 215 is a second set of time series charging data that is also retrieved, which was collected from EV submeters. For example, each known EV owner also includes a respective EV submeter installed at their premise for directly monitoring the charging activity of the electric vehicle. The EV submeter is in addition to the house meter. As previously explained, the EV submeter records the electricity drawn only by the electric vehicle and thus includes charging data in time series of the electricity used for EV charging. This is referred to herein as submeter time series data or EV submeter data. Thus by analyzing the submeter data, the system can easily identify the time intervals when an EV charge started and ended. These time intervals are marked and become part of the generated answer key in block 225.

At 230, the account time series data may be normalized. House electricity usage during a day can be extremely noisy with upward and/or downward spikes in kWh values. In one embodiment, the pre-processing module 120 is configured to reduce the time series into a sequence that can depict each meter's particular magnitude and variance throughout the day. To accomplish this, for example, the kWh values in the account time series for each meter of one or more known EV owners are normalized to itself where each raw kWh value is transformed to be a measure of a number of standard deviations away from a mean kWh value for a given account time series. Other techniques for normalizing the values may be performed.

In FIG. 2, the process shows arrow lines being output from blocks 220 and 230 that are input to a determination block 260, which determines charge features. These lines represent that the time series data from blocks 220 and/or 230 are provided to the determination block 260 so that charge data from the time series can be extracted and used for generating charge features as described below.

At 240, the kWh values in the time series data are encoded with an encoding scheme. In one embodiment, the encoding includes encoding each 15-minute interval kWh of electricity usage collected at a meter into one letter from a sequence of letters/symbols. Thus a series of sequential time intervals becomes a series of symbols. For example, one type of encoding may be performed with a group of sequential letters.

For example in one embodiment, six (6) sequential alphabetical letters may be selected that represent usage-level letters from a low usage level to a high usage level. One group of six letters may be "a, b, c, d, e, f" where "a" is the lowest usage level and "f" is the highest usage level. Thus a time interval with a high usage level during a day would be encoded as T while a lower mid-range level may be encoded as 'c'. Of course, more or fewer letters can be used for coarser or finer approximation and representation of usage levels. The sequence of letters are also not required to be directly sequential in an alphabet. For example, the sequence may skip letters and include a, c, e, g, i, k.

Figure 3:
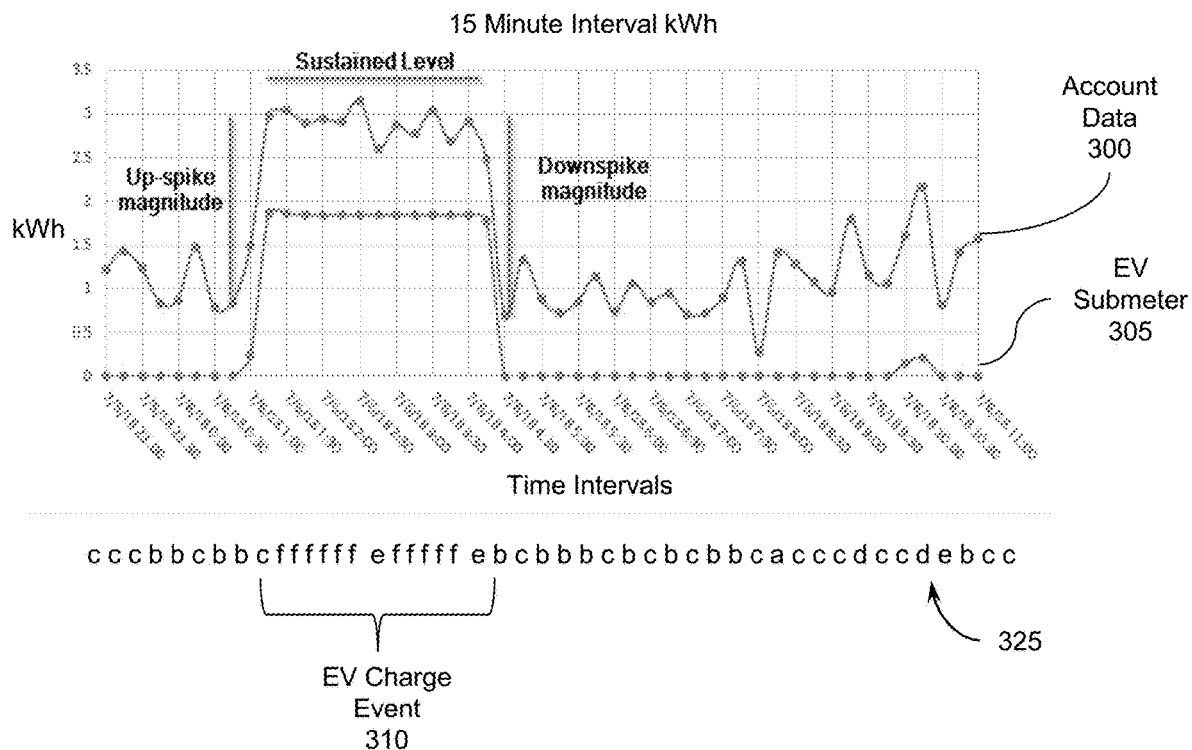
FIG. 3 illustrates an example graph of overlaid kWh charge values from an account meter and from its corresponding EV submeter.

One example of the encoding scheme based on "a, b, c, d, e, f" is shown in FIG. 3 where kWh values an account time series data 300 are displayed in a graph of time intervals. Each kWh value in each time interval is encoded with one of the encoded letters based on the usage level as discussed. A resulting encoding string 325 for the series of time intervals of the account data 300 is shown below the graph of FIG. 3. Each encoded letter of the encoded string 325 is positioned in an approximate alignment below its corresponding kWh value and time interval. FIG. 3 will be discussed in more detail below.

In one embodiment, parameters of the encoding scheme may be tuned or modified including (a) interval length; (b) a probability distribution function as to which the encoding follows; and/or (c) a number of letters to be utilized in encoding.

The low-to-high usage levels are relative to the overall usage levels (e.g., in a range) of the particular time series and thus are not dependent on a particular kWh value. For example, if an account time series for a day had a range of kWh values between 0 and 3 kWh, any time interval with a value of 3 kWh would be assigned the letter T as the highest usage level. Likewise, if a different time series from a much larger house had a range of 0 to 10 kWh, any time interval with a value of 10 kWh would be assigned the letter T as the highest usage level. This encoding is performed for all the 96 time intervals in a time series to generate a string of encoded letters (symbols) representing a consumption pattern of electricity. The string of encoded letters is stored in memory for use in the detection stage. The encoding is also performed for the account time series data from the set of known non-EV owners at block 240a.

The encoded consumption pattern of encoded letters for any given time series thus includes charging patterns that may be identified and matched with other charging patterns. The encoded letters allow the system to detect and match similar charging patterns between different time series data (different consumer accounts) rather than trying to match kWh values. In the above example, three time interval values of 3-3-3 kWh from the first account do not match three other time interval values of 10-10-10 kWh from the second account. However, after encoding, the three time intervals from both data sets would match by having the same encoded string pattern f-f-f because each kWh value is the highest value in its respective time series data.

Quantizing the time series data into a string of letters therefore allows for at least two advantages: (1) condensing the dimensionality of time series into one string of letters; and (2) provides for easier detection of anomalies based on a particular string of letters.

Regarding the first advantage mentioned above: instead of relying on actual magnitude or values from the kWh usage time series (which can easily be distorted due to the size of the house or number of occupants at the residence), the encoding of letters already normalizes each meter's time series to itself. High usage for a particular meter is thus easily recognized via a 'higher' letter (i.e. low usage corresponds to an 'a' or 'b' while high usage could correspond to 'e' or 'f'). The encoding therefore retains not only the meter's unique characteristics in a time series, but also allows for comparison across different meters.

Combined with string searching algorithms, string encoding naturally leads to the second advantage as previously mentioned. It is easier to search through a string of letters for a particular pattern (e.g., searching for a 'word') than to identify anomalies by kWh numbers. Once detection of suspected events has been concluded, the classifier can easily be trained upon charge features related to the suspected EV event to identify true positives away from false positives as discussed below.

Detection Module (Blocks 250 and 260)

After the kWh data is encoded into letters at block 240, the encoded letters in a time series are read from the memory and analyzed to detect an EV charge pattern at block 250. If EV submeter data is not available for a given account time series, the detection module 130 is configured to analyze the encoded letters from the account time series data. Given that an electric vehicle charge is typically characterized by some sustained period of higher level kWh usage, it is very likely that a portion of the time series data that indicates EV charging would be a string of high usage letters in sequence.

Based on the above encoding scheme (that uses low-to-high usage level letters 'a', 'b', 'c', 'd', 'e', and 'f'), a known EV owner account would include a string of high usage letters (e.g., mostly f's and some e's) that forms a letter pattern that represents EV charging. Thus the system searches the encoded letters to identify a suspected charge of an electric vehicle by identifying a sequence of letters/symbols in the encoded consumption pattern of symbols that represent a sequence of sustained high usage level symbols (e.g., multiple consecutive f's and may be some e's).

This letter pattern of high usage letters over a sustained time period is stored as a motif and stored in a motif library of EV usage patterns. The high usage letter patterns are found in multiple known EV owner accounts to create a number of different EV charge patterns (motifs). The EV charge patterns can then be used to identify and detect similar EV charging patterns from other account time series data sets where EV charging is unknown.

Therefore, for a given time series, the system is configured to search for almost consecutive occurrences of high usage letters of various lengths during the entire sequence of letters through a time period. In one embodiment, the system searches for string similarity with the motifs in the motif library to return potential matches of high usage letters throughout the encoded time series of an account. If the search returns potential matches during the day with one or more known EV charging motifs, the system marks the day as having EV charging activity. In one embodiment, the search function is one component of the system's detection module 130.

The account time series data from a location/premise is compared to the EV submeter data collected at the same location/premise. If a suspected charge in the account data overlaps in time intervals with any of the charges from the submeter data, the suspected charge thus includes an EV charge. As previously explained, any charge that occurs in the EV submeter data must be an EV charge. The system then marks the suspected charge as an EV charge. An example is shown in FIG. 3.

In one embodiment at block 250 of FIG. 2, the system detects suspected EV charges by identifying a sustained series or sequence of high usage encoded letters. The suspected EV charge can then be correctly identified and verified by using the account's corresponding EV submeter data (e.g., the generated answer key). For a known EV owner, by matching the time intervals from the account time series data with the corresponding EV submeter time series data, a suspected EV charge can be identified and verified in the account time series data. The submeter's 15-minute interval kWh would indicate when the EV owner approximately began charging their electric vehicle and when EV charging stopped.

The start and stop time intervals from the EV submeter data may be marked and found in the corresponding account time series data as compared to the suspected EV charge. If the time intervals match (overlap each other), then the suspected EV charge in the account data is truly an EV charge. If the suspected EV charge does not overlap the charge time intervals from the EV submeter, then the suspected EV charge is not an EV charge. An example is shown in FIG. 3 where an account time series data 300 is matched (e.g., overlaid) with its corresponding EV submeter time series data 305.

In FIG. 3, the x-axis is in 15 minute time intervals and the y-axis shows a kWh value recorded at the corresponding time interval. For one 24 hour day, there are 96 kWh values in the time series (e.g., 1 by 96 vector of kWh values). FIG. 3 only shows a portion of time intervals for one day. In general when an EV charge occurs, the kWh value in the EV submeter data 305 jumps sharply from 0 kWh to a much higher value. This is shown at the "Up-Spike" point. The kWh level then remains at that high level for a sustained period of time (represented by "Sustained Level" area). When EV charging stops, the kWh value drops sharply in magnitude in the EV submeter data 305 (shown at the "Down spike" point).

At the up-spike and down-spike time intervals, the system knows that these are the start and stop time intervals that designate an EV charge event 310. The time intervals where the EV charges from the EV submeter data 305 overlap the charges in the account data 300 identify the EV charge in the account data 300. Recall that the kWh values in the account data 300 include all electricity charges from an entire premise, which the EV charge is one component of the charge. With the start and stop time intervals from the EV submeter data, the system can identify where in the account time series data 300 that the actual EV charge event occurs. This is identified as the EV charge event 310.

When the start and stop time intervals for the EV charge event 310 are found, the system identifies the corresponding encoded letters that are assigned to the same time period of the EV charge event 310. As shown in FIG. 3, the encoded letters 325 for the account data 300 include the string "f f f f f f e f f f f f e" during the EV charge event 310. This encoded string thus represents a known EV charge event and is stored as one recognized EV charge pattern/motif of encoded letters. The spaces in the string are not required and are shown simply for readability of the encoded letters.

With reference again to FIG. 2, at block 260, once the EV charge event and its start and stop time intervals are identified, the detection module 130 identifies charge features associated with the EV charge event. For example, the data collected in the account time series data 300 that occurs before, during, and at the end of a suspected or identified EV charge event is read. Charging features are extracted and/or calculated from the EV charge event that help to characterize an EV charge from a non-EV charge. The charge features will help the system learn what an EV charge looks like and what an EV charge does not look like so that an EV charge can be distinguished.

For example, the system can extract kWh values and calculate various charge features such as an average consumption of electricity during an EV charge event, a magnitude of the initial sharp jump in kWh when the EV charge starts, a magnitude of the drop in kWh when the EV charge ends, a duration of the EV charge event, a standard deviation of kWh values during the EV charge, a total kWh usage during the EV charge event, a maximum and/or minimum kWh value during the EV charge event. Any combination of these features may be used and other features may be calculated based on the charge data that is available for a given data set. The one or more charge features that are used and stored with the encoded EV charge pattern and serve as charge characteristics or signature of the associated EV charge event.

If the suspected EV charge does not overlap an EV charge from the EV submeter data, then the suspected EV charge is not an actual EV charge. The system may extract kWh values and calculate various charge features for this non-EV charge pattern as explained above. However, these charge features and associated encoded letter patterns are stored as non-EV charge characteristics that can be used to distinguish charge events in subsequent determinations.

Continuing with FIG. 2, for the known non-EV data, the detection module 130 performs a similar process in blocks 250a and 260a but for non-EV charge events. The system identifies encoded letter patterns that are known to be non-EV charges and determines their associated charge features as described above. The encoded patterns of non-EV charges and their charge features characterize what a non-EV charge looks like. Thus the non-EV charge data can be used to assist in determining whether a suspected EV charge is truly an EV charge or a non-EV charge.

Thus, the system uses the account time series data from known non-EV owners as a control group to create a 'true negative' sample as comparison against the known EV owners. The kWh data and time-intervals from members of the control group are processed in the same or similar way as the charge data and charge features from the known EV owners described earlier.

Verification Blocks 270 and 280

At block 270, the EV charge patterns and their associated charge features and input to one or more machine learning classifiers (the classifier). This data trains the classifier to learn from the charge features in order to identify and detect an EV charge event from an unknown data set. Likewise, the non-EV charge patterns and their associated charge features are input to train the classifier to identify non-EV charge patterns and distinguish them from EV charge events.

The classifier can be trained and executed a number of times on account time series data. The classifier is configured to generate a list of detected EV events that the classifier identified as EV charges based on the known EV charge patterns/motifs and charge features. At block 280, the generated list may be compared and verified against the answer key generated at block 225 from the actual EV submeter data. Results of the verification may be fed back to the classifier to correct inaccurate or missed EV charge events, thus further training the classifier.

In one embodiment, the classifier includes a machine learning algorithm that is configured to determine how likely an electric charge being analyzed is a true EV charge. The classifier is trained to learn the difference between EV charges and non-EV charges using the detected EV charge patterns and EV charge features from the detection module 130. The classifier also uses the charge features from the known non-EV owners to distinguish between true EV charges and non-EV charges. The answer key generated in block 225 from the EV submeter data allows the system to test the results of the classifier. The answer key may also be used to train the classifier to identify which charges are from an EV owner and which are from non-EV owners.

Using the detected EV charge patterns and charge features from known EV-owners and charge features from known non-EV owners, the machine learning classifier learns based on observed experience. In this way, the machine learning classifier can be programmed through the provision of the detected information by which it is trained, and the classifier acquires an ability to identify elements or characteristics of an EV charge with high probability.

Training the classifier to look for EV charge patterns is part of a supervised learning process. Supervised learning provides the computer an ability to recognize elements based on provided samples. In this case, the samples include the EV charge patterns and charge features that characterize an associated EV charge event. The computer studies the samples and develops the ability to recognize new data based on the provided data. In one or more embodiments, the supervised learning algorithm may include: decision trees, support-vector machine, Naive Bayes classifier, k-nearest neighbors, and/or linear regression.

In one embodiment, the machine learning classifier is implemented with XG Boost. XG Boost implements machine learning algorithms under a gradient boosting framework. XGBoost provides a parallel tree boosting that solves many data science problems in a fast and accurate way. The classifier code can be implemented and run on various distributed environments such as Hadoop, SGE, and MPI.

In one embodiment, gradient boosting is a machine learning technique for regression and classification problems, which produces a prediction model in the form of an ensemble of weak prediction models, typically decision trees. Predictive modeling is the process by which a model is created to predict an outcome. If the outcome is categorical, it is called classification and if the outcome is numerical, it is called regression.

Once the machine learning classifier is trained, it may be used to identify whether an unknown account has a suspected EV charge. The detection process can be performed systematically for a large number of unknown accounts (thousands, tens of thousands, etc). Thus account time series data collected from meters of unknown accounts may be input to the machine learning classifier for identification of suspected EV charges. If a suspected EV charge is found in a given time series data set, the associated account is marked and labeled as a suspected EV owner. One or more resulting actions may then be performed based on the identified EV owners. An example of this process is described with reference to FIG. 4. Other classifiers, using additional inputs, may be cascaded to the classifier to improve performance.

The novel techniques implemented by the present system and method go above and beyond answering the "yes/no" question of EV detection. Using one or more steps from the process of FIG. 2, the system is able to solve for:

(1) Given a known electric vehicle owner, detect if there is charging activity during the day.

(2) Given a known electric vehicle owner, detect when an electric vehicle is plugged in for charging based on the house's electricity usage (as measured in its account time series data).

(3) Given a time series for an account, is an EV being charged?

In one embodiment, the system implements and uses a logistic classifier, and a decision-tree based algorithm (e.g., Support Vector Machine SVM) to identify EV charges. In the case of the logistic classifier, suspected EV events with an assigned probability of greater than 0.5 are classified as EV charges. Of course, other values may be used.

Example results for solving (1) above that were observed for the present detection system were:

Accuracy=0.852564102564

|  | Detected True | Detected False |
| --- | --- | --- |
| True Charge | 0.949622166247 | 0.31718061674 |
| False Charge | 0.0503778337531 | 0.68281938326 |

For question (3) above, based on a given set of account time series data, the machine learning classifier implemented with an SVM model produced the following results:

|  | Detected True | Detected False |
| --- | --- | --- |
| True Charge | 0.905738 | 0.094262 |
| False Charge | 0.240741 | 0.759259 |

Figure 4:
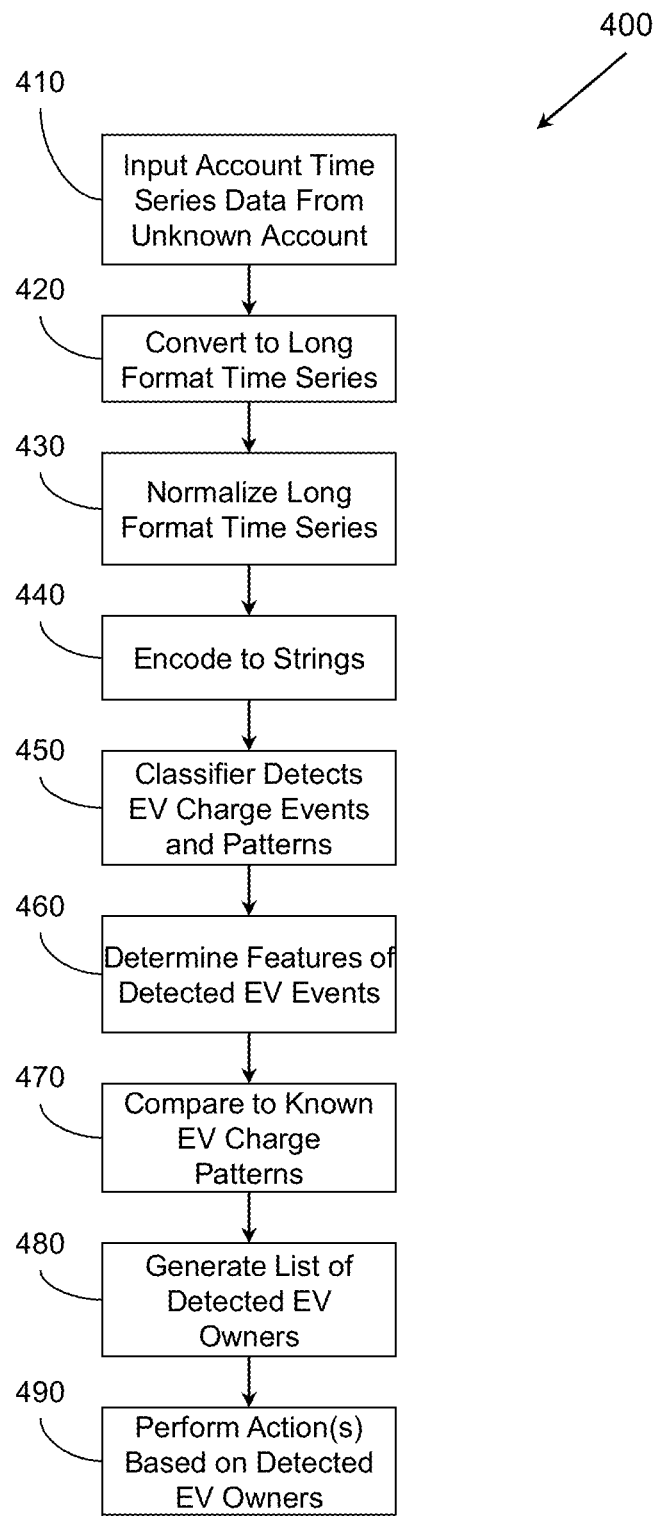
FIG. 4 illustrates one embodiment of a method of detecting EV charge events and EV owners from an unknown data set.

With reference to FIG. 4, one embodiment of an EV detection process 400 is shown for identifying and detecting suspected EV charges from account meter data of an unknown account. Here, unknown account means an account for which it is unknown whether there is an EV owner and thus EV charges associated with the account. The detection process of method 400 uses the trained machine learning classifier described above to predict if an unknown account is associated with an electric vehicle.

The detection process can be performed on selected accounts or systematically for a large number of unknown accounts (thousands, tens of thousands, etc). Thus account time series data collected from meters of unknown accounts may be input to the machine learning classifier for identification of suspected EV charges. If a suspected EV charge is found in a given time series data set, the associated account is marked and labeled as a suspected EV owner. One or more resulting actions may then be performed based on the identified EV owners.

At 410, an account time series data set from an unknown account is read from memory or a data storage device and provided as input. At 420 and 430, the account time series data is converted to a long format time series (e.g., a data vector) and the kWh values are normalized as performed in FIG. 2 blocks 220 and 230. At 440, the normalized kWh values are encoded with the encoding letter scheme as performed in block 240 in FIG. 2. As previously explained, the example scheme uses six letters of low-to-high usage levels a, b, c, d, e, f.

At 450, the encoded letters from the data vector are input to the machine learning classifier. The encoded letters are searched for a letter pattern of high usage letters over a sustained time period, such as a string of "f" letter in a row. As known, a string of high usage letters may represent an EV charge. If no such string is found, the account is marked as a non-EV owner and the next account time series can be input for analysis. If a string of high usage letters is found, the machine learning classifier identifies corresponding time intervals and kWh charges as a suspected EV charge.

At 460, the machine learning classifier determines charge features from the suspected EV charge in a similar manner as the charge features previously discussed for block 260 of FIG. 2. For example, the kWh data collected in the account time series data that occurs before, during, and/or at the end of the suspected EV charge is read from memory or storage. One or more charge features are generated such as an average consumption of electricity during the suspected EV charge, a magnitude of the initial sharp jump in kWh when the suspected EV charge starts, a magnitude of the drop in kWh when the suspected EV charge ends, a duration of the suspected EV charge event, a standard deviation of kWh values during the suspected EV charge, a total kWh usage during the suspected EV charge, a maximum and/or minimum kWh value during the suspected EV charge. Any combination of these charge features may be generated and they represent a charge characteristic (e.g., a signature) of the associated suspected EV charge.

At 470, the machine learning classifier determines whether the charge features and encoded letters of the suspected EV charge match any of the known EV charge patterns/motifs and their corresponding known charge features. The match may be based on comparing corresponding types of charge features and determining if the values match to a certain degree (e.g., to a set threshold amount). For example, the classifier determines whether the average consumption of electricity that was used during the suspected EV charge matches the average consumption of electricity that was used during a known EV charge event from a matching EV charge pattern/motif.

This comparison may be performed for the other different types of charge features and a total score of matching results may be generated. The threshold amount of similarity of a match for each type of charge feature may be defined and set in the classifier algorithm. In one embodiment, the matching involves pattern matching using the learned observations from the known EV charge patterns/motifs and their corresponding charge features as learned from the process of FIG. 2.

At 480, if the suspected EV charge does match one or more known EV charge patterns and does match the associated EV charge features to a specified degree, the suspected EV charge is marked as an EV charge and its account is marked as a likely EV owner account. The process may then be repeated for additional accounts. A list or other data output is generated that identifies the accounts with are likely associated with an electric vehicle charge. The accounts are marked as EV owners.

If the charge features of suspected EV charge do not match within the threshold of the known EV charge features, the suspected charge is marked as a non-EV charge and the analysis is repeated for any other suspected EV charges in the account time series data set. If no EV charges are identified, the account is marked as a non-EV owner. The process of method 400 may then be continued and repeated for time series data set.

At 490, one or more result actions may then be performed based on the identified EV owners. In one embodiment, the one or more resulting actions include, for example, generating and transmitting messages to a remote device of an EV owner to change their account to a different (better) electrical rate for EV charging (provides better customer engagement). The system may identify if EV owners are charging during on-peak or off-peak hours. Based on the charging times being in on-peak hours, the system may generate and transmit an electronic message with instructions to a remote device associated with the EV owner. The electronic message may include instructions for modifying charging times to off-peak hours and/or modifying account settings that cause one or more EV owners to change to a "Time of Use" rate to shift the EV charging load to off-peak hours.

Another resulting action may include identifying locations of EV owners in an electric grid and determining their location to each other. The system can then identify EV "hot spots" in the grid that may represent significant load increase in a specific area that has multiple EV owners.

Based on periodically monitoring and identifying EV owners with the present system, the system may identify trends and velocity of EV uptake at system wide levels and/or at more localized levels. If there is a certain increase in the number of detected EV owners in a particular area in the grid, corrective actions and modifications can be made to the electric grid equipment to ensure safe and proper electrical distribution. These actions may include modifying or resizing transformers, reroute power lines, etc.

In one embodiment, generating the instructions includes generating an electronic message that includes information regarding the detected EV charge and information about changing EV charging behavior (e.g., change charging time to off-peak hours). By causing a change in charging behavior, the load on the electric grid can be reduced at particular times. The generated message may then be transmitted via a network communication to a remote device associated with the detected EV owner such as an email, text message, electronic phone message, or other electronic form.

In another embodiment, the system and method may instruct and control a printer to print a hard copy of the generated message to be delivered in physical form to a location associated with the detected EV owner.

In another embodiment of electric vehicle detection system based on the previous descriptions, the following process may be performed. The detection system may receive a first time series of electricity consumption data from an electrical vehicle (EV) owner and encode (by a processor accessing a memory) the time series into an EV usage pattern of symbols that includes an EV charging pattern as described previously. The detection system may then encode, by the processor accessing a memory, a second time series of electricity consumption data from a non-electrical vehicle (non-EV) owner into a non-EV usage pattern of symbols. The detection system may then configure and train a machine learning classifier with the EV usage pattern of symbols (that includes the EV charging pattern) and the non-EV usage pattern of symbols to detect and identify a similar electrical vehicle charging pattern from an unknown time series of electricity consumption data.

After one or more rounds of training, the machine classifier may then be used to analyze an unknown data set. For example, in response to receiving a first unknown time series of electricity consumption data, the machine learning classifier detects whether the first unknown time series of electricity consumption data includes the similar electric vehicle charging pattern based on the information used to train the classifier. The machine learning classifier generates an output that identifies the first unknown time series as an EV owner or as a non-EV owner based on the detection results. This may be repeated for any number of unknown time series of data.

Electric utilities can use the improved accuracy of the present system and method of electric vehicle detection to identify accounts that have electric vehicles. At explained, various actions may be performed after one or more EV owners are identified. Based on locations of the identified EV owners, network components on an electric grid that may be subject to overload may be identified. Overload may occur when multiple EV owners are detected and found on the same neighborhood electric grid. This directly drives value for utilities in terms of better controlling the load on the electric grid, targeting energy efficiency programs to identified EV owners, generating and targeting demand response programs to identified EV owners, and/or performing deferred upgrades to network components in the grid, or just-in-time upgrades to network components of the grid.

Cloud or Enterprise Embodiments

In one embodiment, the present electric vehicle charging detection system is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the detection system is implemented as part of a centralized server-side application that provides at least the functions disclosed herein and that is accessed by many users via computing devices/terminals communicating with the computing system 100 (functioning as the server) over a computer network.

In one embodiment, one or more of the components described herein including the EV detection system 100 are configured as program modules stored in a non-transitory computer readable medium. The program modules are configured with stored instructions that when executed by at least a processor cause the computing device to perform the corresponding function(s) as described herein.

Computing Device Embodiment

Figure 5:
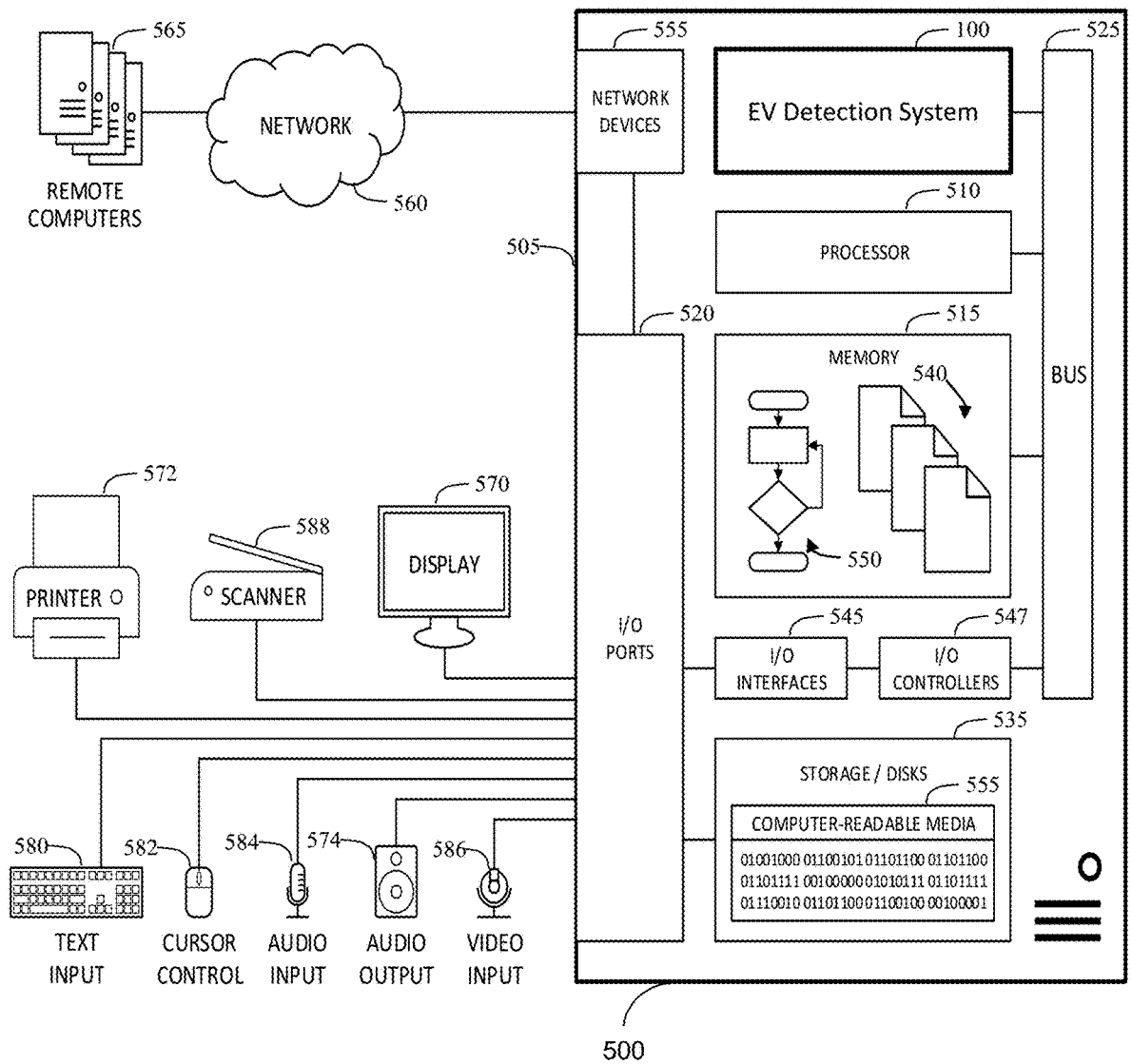
FIG. 5 illustrates an embodiment of a computing system configured with the example systems and/or methods disclosed.

In one embodiment, FIG. 5 illustrates a computing device configured and/or programmed as a special purpose computing device with one or more components of the present electric vehicle detection system 100 and methods described herein, and/or equivalents.

The example computing device may be a computer 505 that includes a hardware processor 510, a memory 515, and input/output ports 520 operably connected by a bus 525. In one example, the computer 505 is configured with the EV detection system 100 as shown and described with reference to FIGS. 1-4. In different examples, the EV detection system 100 may be implemented in hardware, a non-transitory computer-readable medium with stored instructions, firmware, and/or combinations thereof.

In one embodiment, EV detection system 100 and/or the computer 505 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The EV detection system 100 may also be implemented as stored computer executable instructions that are presented to computer 505 as data 540 that are temporarily stored in memory 515 and then executed by processor 510.

Generally describing an example configuration of the computer 505, the processor 510 may be a variety of various processors including dual microprocessor and other multi-processor architectures. A memory 515 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 535 may be operably connected to the computer 505 via, for example, an input/output (I/O) interface (e.g., card, device) 545 and an input/output port 1020. The disk 535 may be, for example, a magnetic disk drive, a solid-state disk drive, a floppy disk drive, a tape drive, a Zip drive, a flash memory card, a memory stick, and so on. Furthermore, the disk 535 may be a CD-ROM drive, a CD-R drive, a CD-RW drive, a DVD ROM, and so on. The memory 515 can store a process 550 and/or a data 540, for example. The disk 535 and/or the memory 515 can store an operating system that controls and allocates resources of the computer 505.

The computer 505 may interact with input/output (I/O) devices via the I/O interfaces 545 and the input/output ports 520. The communications between the processor 510 and the I/O interfaces 545 and ports 520 are managed by an input/output controller 547. The input/output ports 520 may include, for example, serial ports, parallel ports, and USB ports.

The computer 505 can operate in a network environment and thus may be connected to the network devices 555 via the I/O interfaces 545, and/or the I/O ports 520. Through the network devices 555, the computer 505 may interact with a network 560. Through the network 560, the computer 505 may be logically connected to remote computers 565. Networks with which the computer 505 may interact include, but are not limited to, a LAN, a WAN, and other networks.

The computer 505 can send and receive information and signals from one or more output devices or input devices through I/O ports 520. The output devices include one or more displays 570, printers 572 (such as inkjet, laser, or 3D printers), and audio output devices 574 (such as speakers or headphones). The input devices include one or more text input devices 580 (such as keyboards), cursor controllers 582 (such as mice, touchpads, or touch screens), audio input devices 584 (such as microphones), video input devices 586 (such as video and still cameras), or other input devices, such as scanner 588. Input/output devices may further include the disk 535, the network devices 555, and so on. In some cases, the computer 505 can be controlled by information or signals generated or provided by input or output devices, such as by text input devices 580, cursor controllers 582, audio input devices 584, disk 535, and network devices 555.

Definitions and Other Embodiments

No function described or claimed herein is performed in the human mind. Any such interpretation is inconsistent with this disclosure.

In one embodiment, the described methods and/or their equivalents are implemented with stored computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium or memory where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer implemented method performed by a computing device with at least one processor, the method comprising:
   receiving unknown time series data of usage values of electricity consumption from a plurality of accounts, wherein the unknown time series data that corresponds to an account is unknown to have electric vehicle (EV) charge events;
   for a given account of the plurality of accounts:
   converting the unknown time series data of usage values into a data structure of time intervals with corresponding usage values;
   encoding each of the time intervals with a symbol from a series of symbols representing a level of electricity consumption during the time interval;
   wherein the encoding generates an encoded consumption pattern of symbols;
   executing a machine learning classifier with the encoded consumption pattern of symbols, wherein the machine learning classifier is trained to identify a set of known electric vehicle (EV) charge motifs comprising a sequence of symbols that represents an EV charging event that is distinguished from a non-charge motif;
   detecting, by the machine learning classifier, whether the encoded consumption pattern of symbols from the given account includes a string of high usage symbols that are similar to one of the set of known EV charge motifs; and
   marking, by the machine learning classifier, the given account as having an electric vehicle charge event or as not having an electric vehicle charge event based at least on the detecting.

2. The computer implemented method of claim 1, wherein the encoding further comprises:
   applying an encoding scheme of letters that represent the level of electricity consumption from a low usage level to a high usage level relative to a range of the usage values in the unknown time series data.

3. The computer implemented method of claim 1, wherein the encoding further comprises:
   encoding each of the time intervals of electricity usage into one symbol from the series of symbols representing the level of electricity consumption in a given time interval, wherein a series of sequential time intervals becomes the encoded consumption pattern of symbols.

4. The computer implemented method of claim 1, wherein the marking further comprises:
   in response to detecting that the encoded consumption pattern of symbols matches one motif from the set of known EV charge motifs, identify the given account as having an electric vehicle; and
   in response to detecting that the encoded consumption pattern of symbols does not match one motif from the set of known EV charge motifs, identify the given account as a non-electric vehicle owner.

5. The computer implemented method of claim 1, wherein detecting whether the encoded consumption pattern of symbols includes the string of high usage symbols comprises:
   comparing one or more charge features from one or more known EV charging events to corresponding charge features from the unknown time series data to determine if a match is found within a threshold; and
   generating an output in accordance with a result of the match.

6. The computer implemented method of claim 1, wherein detecting whether the encoded consumption pattern of symbols includes the string of high usage symbols comprises:
   searching the encoded consumption pattern of symbols from the unknown time series data for a symbol pattern of high usage symbols over a sustained time period of time intervals;
   identifying the symbol pattern of high usage symbols as a suspected EV charge event;
   determining charge features from the usage values in the sustained time period of time intervals; and
   determining, by the machine learning classifier, whether the symbol pattern and the charge features of the suspected EV charge event match any of the known EV charge motifs and corresponding known charge features of a known EV charge event.

7. The computer implemented method of claim 1, wherein the method further comprises:
   generating and transmitting an electronic message to a remote device associated with the account, wherein the electronic message includes instructions to change EV charging times to off-peak hours.

8. A computing system, comprising:
   at least one memory;
   at least one processor connected to the at least one memory;
   an electric vehicle detection module stored on a non-transitory computer readable medium and including instructions that when executed by at least the processor cause the processor to:
   receive unknown time series data of usage values of electricity consumption from a given account of a plurality of accounts, wherein the unknown time series data is unknown to have electric vehicle (EV) charge events;
   convert the unknown time series data of usage values into a data structure of time intervals with corresponding usage values;
   encode each of the time intervals with a symbol from a series of symbols representing a level of electricity consumption during the time interval;
   wherein the encoding generates an encoded consumption pattern of symbols;
   execute a machine learning classifier with the encoded consumption pattern of symbols, wherein the machine learning classifier is trained to identify a set of known electric vehicle (EV) charge motifs comprising a sequence of symbols that represents an EV charging event that is distinguished from a non-charge motif;
   detect, by the machine learning classifier, whether the encoded consumption pattern of symbols from the given account includes a string of high usage symbols that are similar to one of the set of known EV charge motifs; and
   mark, by the machine learning classifier, the given account as having an electric vehicle charge event or as not having an electric vehicle charge event based at least on the detecting.

9. The computing system of claim 8, wherein the instructions for encoding are configured to cause the processor to:
   apply an encoding scheme of letters that represent the level of electricity consumption from a low usage level to a high usage level relative to a range of the usage values in the unknown time series data.

10. The computing system of claim 8, wherein the instructions for encoding are configured to cause the processor to:
   encode each of the time intervals of electricity usage into one symbol from the series of symbols representing the level of electricity consumption in a given time interval, wherein a series of sequential time intervals becomes the encoded consumption pattern of symbols.

11. The computing system of claim 8, wherein the instructions for marking further comprise instructions configured to cause the processor to:
   in response to detecting that the encoded consumption pattern of symbols matches one motif from the set of known EV charge motifs, identify the given account as having an electric vehicle; and
   in response to detecting that the encoded consumption pattern of symbols does not match one motif from the set of known EV charge motifs, identify the given account as a non-electric vehicle owner.

12. The computing system of claim 8, wherein the instructions for detecting whether the encoded consumption pattern of symbols includes the string of high usage symbols further comprise instructions configured to cause the processor to:
   compare one or more charge features from one or more known EV charging events to corresponding charge features from the unknown time series data to determine if a match is found within a threshold; and
   generate an output in accordance with a result of the match.

13. The computing system of claim 8, wherein the instructions for detecting whether the encoded consumption pattern of symbols includes the string of high usage symbols further comprise instructions configured to cause the processor to:
   search the encoded consumption pattern of symbols from the unknown time series data for a symbol pattern of high usage symbols over a sustained time period of time intervals;
   identify the symbol pattern of high usage symbols as a suspected EV charge event;
   determine charge features from the usage values in the sustained time period of time intervals; and
   determine, by the machine learning classifier, whether the symbol pattern and the charge features of the suspected EV charge event match any of the known EV charge motifs and corresponding known charge features of a known EV charge event.

14. The computing system of claim 8, wherein the instructions further comprising instructions to cause the processor to:
   identify locations of EV owners in an electric grid based on the plurality of accounts that are marked as having the electric vehicle charge event; and
   identify EV hot spots in the electric grid that represent a load increase in an area that has multiple EV owners.

15. The computing system of claim 8, wherein the instructions further comprising instructions to cause the processor to, for an account that is marked as having the electric vehicle charge event:
   generate and transmit an electronic message to a remote device associated with the account, wherein the electronic message includes instructions to change EV charging times to off-peak hours.

16. A non-transitory computer-readable medium storing computer-executable instructions that when executed by at least a processor of a computer cause the computer to:
   receive unknown time series data of usage values of electricity consumption from given account from a plurality of accounts, wherein the unknown time series data is unknown to have electric vehicle (EV) charge events;
   convert the unknown time series data of usage values into a data structure of time intervals with corresponding usage values;
   encode each of the time intervals with a symbol from a series of symbols representing a level of electricity consumption during the time interval;
   wherein the encoding generates an encoded consumption pattern of symbols;
   detect whether the encoded consumption pattern of symbols from the given account includes a string of high usage symbols that are similar to a known EV charge motif that represents a known EV charging event that is distinguished from a non-charge motif; and
   mark the given account as having an electric vehicle charge event or as not having an electric vehicle charge event based at least on the detecting.

17. The non-transitory computer-readable medium of claim 16, wherein the instructions for encoding are configured to cause the processor to:
   apply an encoding scheme of letters that represent the level of electricity consumption from a low usage level to a high usage level relative to a range of the usage values in the unknown time series data.

18. The non-transitory computer-readable medium of claim 16, wherein the instructions for encoding are configured to cause the processor to:
   encode each of the time intervals of electricity usage into one symbol from the series of symbols representing the level of electricity consumption in a given time interval, wherein a series of sequential time intervals becomes the encoded consumption pattern of symbols.

19. The non-transitory computer-readable medium of claim 16, wherein the instructions for marking further comprise instructions configured to cause the processor to:
   in response to detecting that the encoded consumption pattern of symbols matches one motif from the set of known EV charge motifs, identify the given account as having an electric vehicle;
   in response to detecting that the encoded consumption pattern of symbols does not match one motif from the set of known EV charge motifs, identify the given account as a non-electric vehicle owner; and
   repeat the converting, encoding, detecting, and marking for other accounts from the plurality of accounts.

20. The non-transitory computer-readable medium of claim 16, wherein the instructions for detecting whether the encoded consumption pattern of symbols includes the string of high usage symbols further comprise instructions configured to cause the processor to:
   search the encoded consumption pattern of symbols from the unknown time series data for a symbol pattern of high usage symbols over a sustained time period of time intervals;
   identify the symbol pattern of high usage symbols as a suspected EV charge event;
   determine charge features from the usage values in the sustained time period of time intervals; and
   determine whether the symbol pattern and the charge features of the suspected EV charge event match any of the known EV charge motifs and corresponding known charge features of a known EV charge event.

* * * * *

UNITED STATES PATENT AND TRADEMARK OFFICE
CERTIFICATE OF CORRECTION

PATENT NO. : 11,667,210 B2
APPLICATION NO. : 17/826651
DATED : June 6, 2023
INVENTOR(S) : Lu et al.

It is certified that error appears in the above-identified patent and that said Letters Patent is hereby corrected as shown below:

In the Specification

In Column 6, Line 67, Delete "T" and insert -- 'f' --.

In Column 7, Line 28, Delete "T" and insert -- 'f' --.

In Column 7, Line 31, Delete "T" and insert -- 'f' --.

In Column 8, Line 30, Delete "may be" and insert -- maybe --.

Signed and Sealed this
Thirtieth Day of April, 2024

Katherine Kelly Vidal
*Director of the United States Patent and Trademark Office*